United States Patent
Jardine et al.

(10) Patent No.: US 6,883,570 B2
(45) Date of Patent: Apr. 26, 2005

(54) TIRE WITH DOUBLE HALF-CARCASSES AND LOW-PROFILE CROWN REINFORCEMENTS

(75) Inventors: David Jardine, Clermont-Ferrand (FR); Pascal Auxerre, Royat (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 10/834,287

(22) Filed: Apr. 29, 2004

(65) Prior Publication Data

US 2004/0200556 A1 Oct. 14, 2004

Related U.S. Application Data

(63) Continuation of application No. PCT/EP02/12020, filed on Oct. 28, 2002.

(30) Foreign Application Priority Data

Oct. 29, 2001 (FR) .............................................. 01 14088

(51) Int. Cl.$^7$ .............................. B60C 9/22; B60C 9/18; B60C 9/04
(52) U.S. Cl. ....................... 152/531; 152/532; 152/534; 152/538; 152/550; 152/551; 152/555
(58) Field of Search ................................. 152/531, 532, 152/534, 538, 550, 551, 555

(56) References Cited

U.S. PATENT DOCUMENTS

| | | | |
|---|---|---|---|
| 2,958,359 A | | 11/1960 | Boussu et al. |
| 4,067,372 A | * | 1/1978 | Masson .................. 152/555 X |
| 4,895,692 A | | 1/1990 | Laurent et al. |
| 5,971,048 A | * | 10/1999 | Ashmore et al. ....... 152/551 X |
| 2004/0200557 A1 | * | 10/2004 | Jardine et al. .............. 152/531 |

FOREIGN PATENT DOCUMENTS

| | | |
|---|---|---|
| EP | 0 264 600 | 4/1988 |
| EP | 0 580 055 | 1/1994 |
| EP | 0 582 196 | 2/1994 |
| EP | 1 057 659 | 12/2000 |
| JP | 2001-088511 | 4/2001 |
| WO | WO02/00451 | 1/2002 |

* cited by examiner

*Primary Examiner*—Adrienne C. Johnstone
(74) *Attorney, Agent, or Firm*—Burns, Doane, Swecker & Mathis, L.L.P.

(57) ABSTRACT

A tire comprising at least one reinforcement structure of carcass type anchored on each side of the tire in a bead, a crown reinforcement, each bead being extended radially towards the outside by a sidewall, said reinforcement structure being discontinuous over at least a portion of the crown of the tire, said crown reinforcement comprising on the one hand at least one primary reinforcement structure covering substantially the entire width of the crown and comprising on the one hand, on each side of the tire, a lateral primary reinforcement structure portion disposed radially outside the adjacent carcass-type reinforcement structure portion and on the other hand a median primary reinforcement structure portion disposed radially more to the inside than the lateral primary reinforcement structure portions and at least one substantially axial row of median circumferential reinforcements disposed radially to the outside, substantially adjacent the median primary reinforcement structure portion.

13 Claims, 3 Drawing Sheets

TIRE WITH DOUBLE HALF-CARCASSES AND LOW-PROFILE CROWN REINFORCEMENTS

The present application is a continuation of International Application Serial No. PCT/EP02/12020 filed on Oct. 28, 2002, and which claims priority under 35 U.S.C. §119 to patent application Ser. No. 01/14088 filed in France on Oct. 29, 2001, the entire content of which is hereby incorporated by reference.

The present invention relates to tires. More particularly, it relates to the arrangement and configuration of the reinforcement structure in the crown zone of the tire.

Tire reinforcements currently comprise one or more plies known conventionally as "carcass plies", "crown plies", etc. This way of naming the reinforcements results from the manufacturing process, consisting of producing a series of semi-finished products in the form of plies, provided with frequently longitudinal cord reinforcements, which are then assembled to build a tire. The plies are made flat, with large dimensions, and are then cut as a function of the dimensions of a given product. The plies are also assembled substantially flat in a first phase. The blank thus produced is then shaped into the toroidal profile typical of tires. The semi-finished products known as "finishing products" are then applied to the blank, in order to obtain a product which is ready for vulcanisation.

This same conventional process involves the use of a bead wire, used to effect anchoring or retention of the carcass ply in the bottom zone of the sidewall. Thus, conventionally, a portion of ply is turned up about a bead wire disposed in the tire bead. The carcass ply is thereby anchored in the bead.

The widespread use in the industry of this conventional process, despite numerous variants in the manner of producing plies and assemblies, has led the person skilled in the art to use a vocabulary modelled on the process; hence the generally accepted terminology, consisting in particular of the terms "plies", "carcass", "bead wire", "shaping" used to designate the transformation from a flat profile to a toroidal profile etc.

However, tires now exist which do not strictly speaking comprise "plies" or "bead wires" which fit the above definitions. For example, document EP 0 582 196 describes tires manufactured without the aid of semi-finished products in the form of plies. For example, the cords of the various reinforcement structures are applied directly to the adjacent layers of rubber mixes, the whole being applied in successive layers to a toroidal core, the shape of which allows the direct obtainment of a profile resembling the final profile of the tire being manufactured. Thus, in this case there are no longer "semi-finished products", or "plies" or "bead wires". The basic products such as the rubber mixes and the reinforcements in the form of filaments are applied directly to the core. Since this core is toroidal in shape, the blank no longer has to be shaped in order to be transformed from a flat profile to a profile in the form of a torus.

Furthermore, the tires described in this document do not have the traditional carcass ply turn-up about a bead wire. This type of anchoring is replaced by an arrangement in which circumferential filaments are disposed adjacent said sidewall reinforcing structure, the whole being immersed in an anchoring or bonding rubber mix.

Assembling processes using a toroidal core also exist which use semi-finished products specially adapted for rapid, effective and simple laying on a central core. Finally, it is also possible to use a composite comprising certain semi-finished products to achieve certain architectural aspects (such as plies, bead wires, etc), while others are achieved by the direct application of mixes and/or reinforcements in the form of filaments.

In the present document, so as to take account of recent technological developments both in the field of manufacture and in the design of products, the conventional terms such as "plies", "bead wires" etc are advantageously replaced by neutral terms or terms which are independent of the type of process used. Thus, the term "reinforcement of carcass type" or "sidewall reinforcement" may be used to denote the reinforcing cords of a carcass ply in the conventional process and the corresponding cords, generally applied at the level of the sidewalls, of a tire produced according to a process not using semi-finished products. The term "anchoring zone", for its part, may denote both the conventional carcass ply turn-up about a bead wire of a conventional process and the assembly formed by the circumferential filaments, the rubber mix and the adjacent sidewall reinforcement portions of a bottom zone produced using a process involving application on a toroidal core.

Whatever the process used, the reinforcements of carcass type, or sidewall reinforcements, generally extend from one bead to the other via the crown. They thus contribute in part to the reinforcement of the crown zone. Other elements, such as reinforcement cords arranged in a single layer or in multiple layers (such as for example cords at 30 degrees relative to the circumferential direction), contribute to establishing a crown structure which is sufficiently rigid, hard-wearing etc to fulfill the anticipated conditions of use.

Depending on type of use, a larger or smaller number of reinforcement elements are required at the level of the crown. These elements sometimes occupy a large space and/or constitute a large mass. The thickness of the crown zone thus frequently depends on the type of reinforcements which this zone has to accommodate. Although it is often desirable to limit the thickness and/or mass of said zone, there is often only limited room for manoeuvre. In effect, the "weight/bulk/mechanical properties" compromise frequently obliges designers to lower their sights with regard to the first two aspects in order to satisfy the third. One way or another, the achievement of a perfect balance between each of the facets of this compromise usually requires numerous tests sometimes involving numerous modifications before a suitable balance is obtained.

The present invention is directed at optimising this compromise for certain types of tires.

Thus, the invention provides a tire comprising at least one reinforcement structure of carcass type anchored on each side of the tire in a bead whose base is designed to be mounted on a rim seat, a crown reinforcement, each bead being extended radially towards the outside by a sidewall, the sidewalls meeting up radially towards the outside with a tread, the reinforcement structure extending circumferentially from the bead towards said sidewall, said reinforcement structure being discontinuous over at least a portion of the crown of the tire, said crown reinforcement comprising on the one hand at least one primary reinforcement structure (crown ply) covering substantially the entire width of the crown and comprising on the one hand, on each side of the tire, a lateral primary reinforcement structure portion disposed radially outside the adjacent carcass-type reinforcement structure portion and on the other hand a median primary reinforcement structure portion disposed radially more to the inside than the lateral primary reinforcement structure portions.

Such an architecture provides numerous advantages. For example, the crown region may be made thinner and/or lighter. The crown zone without reinforcement structure allows economies of material. It also allows the meridian and circumferential rigidity of the tire to be optimised. Moreover, the presence of reinforcements of a radius which varies at the centre relative to the edges allows transverse rigidity to be increased.

Otherwise, the substantially central zone of the crown, freed of the presence of the carcass-type structures, may advantageously be used for the incorporation of other types of architectural or structural element, such as for example reinforcements, cables, cords, inserts, rubber zones exhibiting different mechanical characteristics etc.

According to one advantageous example of embodiment of the invention, at least one substantially axial row of median circumferential reinforcements is disposed radially to the outside, substantially adjacent to the median primary reinforcement structure portion.

According to another advantageous example of embodiment of the invention, at least one substantially axial row of lateral circumferential reinforcements is disposed each side of the tire. Such a row may be disposed radially outside the lateral primary reinforcement structure portion, or radially inside the lateral primary reinforcement structure portion.

With the lateral circumferential reinforcements disposed radially to the outside, it is possible to obtain, for example:
  improved control of the profile during centrifugation;
  circumferential rigidification of the shoulder capable of limiting shear between the crown reinforcements, thereby assisting in reducing splitting phenomena;
  protection conferred by the metal reinforcements against attack, puncture, etc.

With the lateral circumferential reinforcements disposed radially to the inside, it is for example possible to achieve the following, in addition to the above-cited advantages:
  due to positioning close to the neutral axis, the circumferential reinforcements work more under extension, thus contributing to rigidification of the crown.

According to another advantageous example of embodiment, the row of median circumferential reinforcements extends over a width substantially identical to that of said median primary reinforcement structure portion.

According to another example of embodiment, the radial position of said median circumferential reinforcements allows the latter to overlap between the ends of the carcass-type reinforcement structure, thereby achieving a similar radial position for these reinforcements. It is thus possible to achieve a crown gradient which is substantially homogeneous under the action of an increase in pressure and/or speed.

According to another advantageous example of embodiment, the crown comprises a zone provided with a radially inner excess thickness. This is a particularly clever way of providing a space capable of accommodating various architectural elements, by using the free space in the tire cavity, thus without encroaching upon the crown zone.

The crown zone provided with an excess thickness is advantageously delimited axially by at least one transitional zone signalling the changeover of the internal wall of the tire towards a smaller radius while extending axially inwards.

One advantageous embodiment provides the advantage of reinforcements with a smaller radius at the centre: accentuation of the difference in radius between the centre of the crown and the shoulders by radially inward positioning of the radially inner limit of the internal wall of the tire makes it possible to increase the depth of the grooves, and consequently the water storage capacity.

The primary reinforcement structure advantageously comprises, in the junction zones between the median reinforcement structure portion and the lateral reinforcement structure portions, at least one transitional zone marking passage between the primary reinforcement structure zones of different radii.

According to an advantageous variant embodiment, the tire also comprises a secondary reinforcement structure disposed radially to the outside relative to the primary reinforcement structure, for example substantially between the lateral primary reinforcement structure portions.

The primary and/or secondary reinforcement structure may comprise cord elements generally arranged at an angle other than zero degrees relative to the circumferential direction. (This may be a fixed angle or vary according to the axial position. It may pass through zero degrees at a given point, but the main portion of its course preferably exhibits angles other than this value.)

According to another advantageous example of embodiment of the invention, the tire also comprises a peripheral rubber mix zone disposed radially towards the outside relative to the primary reinforcement structure, for example substantially between the lateral primary reinforcement structure portions. The presence of such a zone may achieve various advantages, such as for example: protection against external attack, improved endurance and/or comfort, reduced rolling resistance and/or noise, increased rigidity etc.

The tire advantageously comprises at least one substantially median extra-deep hollow. Extra-deep means that the depth is advantageously greater than for a traditional tire. For example, a groove may be extended radially so as to be substantially radially aligned with the lateral circumferential reinforcements, or may even be extended radially to the inside of these reinforcements. This greater depth provides flexibility of action, depending on requirements and the type of tire. For example, deeper grooves may serve to accommodate/evacuate a greater amount of water, contributing to optimisation of the hydrodynamic qualities of a tire.

According to another advantageous example, the reinforcement structure of carcass type is double over at least one of the two sides of said tire. It is possible to have a double reinforcement for example solely on the outer side of the tire, for fitting on the outer side of the vehicle. The tire is then simple and cheap, while displaying excellent protection against the hazards of the road, such as impacts. It may also constitute a mode of reinforcement for the sidewall, a means of adjusting or increasing the rigidity of the sidewall, etc.

Advantageously, the tire according to the invention may be manufactured by means of a tire manufacturing process in which the various constituent elements are laid in turn directly on a core, the profile of which corresponds substantially to that of the final product, and in which laying of a first reinforcement structure on a first side of a tire and of a second reinforcement structure on a second side of said tire may be effected substantially simultaneously.

In the case of a tire manufactured by such an automated process, in which the various constituent elements are laid in turn directly on a core, whose profile corresponds substantially to that of the final product, the provision of two independent half-structures may allow manufacturing time to be optimised. Thus, for example, it is possible to use two reinforcement structure laying machines, capable of operating simultaneously during manufacture of the tire. The result thereof is therefore a considerable reduction in reinforcement structure laying time.

In the present specification, the term "cord" denotes wholly generally both monofilaments and multifilaments, or assemblies such as cables, plied yarns or indeed any equivalent type of assembly, whatever the material of these cords and whatever the treatment they have undergone, for example surface treatment or coating or presizing to promote adhesion to the rubber.

A "circumferentially oriented cord" denotes a cord oriented substantially in a single axial plane or in a plane forming an angle less than or equal to 10° with an axial plane.

As a reminder, "radially towards the top" or "radially upper" means towards the larger radii.

The "modulus of elasticity" of a rubber mix is a secant modulus of extension obtained under uniaxial extension deformation of the order of 10% at ambient temperature.

A reinforcing or reinforcement structure of carcass type is radial when its cords are arranged at 90°, but also, according to the terminology in use, at an angle close to 90°.

It is known that, in the art as it currently stands, the carcass ply or plies are turned up about a bead wire. The bead wire then performs the function of carcass anchoring, that is to say it absorbs the tension developing in the carcass cords under the effect of the inflation pressure. In the configurations described in the present application, not using a bead wire of traditional type, the function of anchoring the reinforcement structure of carcass type is likewise ensured.

It is also known that, still as in the prior art, the same bead wire additionally performs the function of clamping the bead to its rim. In the configurations described in the present application, not using a bead wire of traditional type, the clamping function is likewise ensured, in particular by the circumferential cord windings closest to the seat.

It goes without saying that the invention may be used in generally attaching other elements to the bead or to the bottom zone of the tire, as certain variants will illustrate. Likewise, in the invention multiple reinforcement structures of the same nature may be used or a different type of reinforcement structure may be attached.

All practical details are given in the following description, supplemented by FIGS. 1 to 6, in which.

Figure 1:
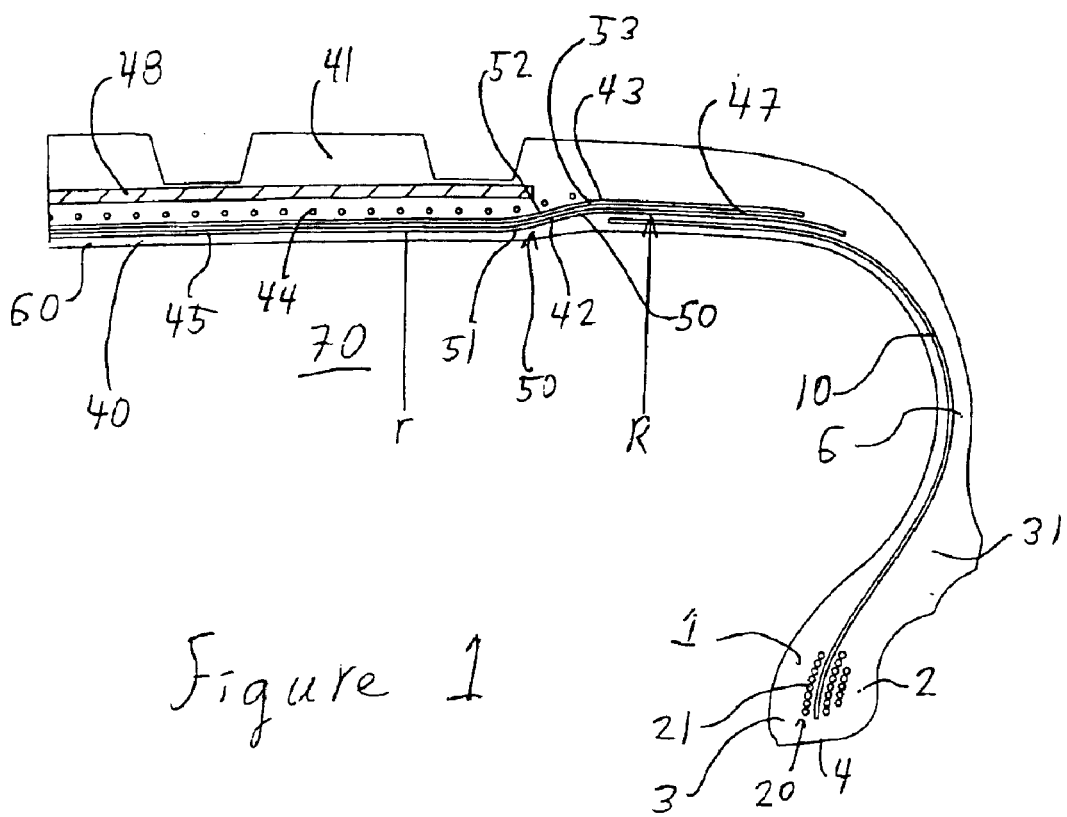
FIG. 1 is a radial section essentially showing a sidewall, a bead and a crown portion of a first form of embodiment of a tire according to the invention.

FIG. 1 is a sectional view of a first form of embodiment of the tire according to the invention. The bead 1 comprises an axially outer portion 2 provided and shaped in such a way as to be placed against the flange of a rim. The bead 1 ends radially towards the inside in a bead seat 4, adapted to be disposed against a rim seat. The bead likewise comprises an axially inner portion 3, extending substantially radially from the seat 4 towards the sidewall 6.

The tire also comprises a reinforcing structure 10 or carcass-type reinforcement structure provided with reinforcements advantageously configured in a substantially radial arrangement. This structure preferably comprises two portions, for example one each side of the tire, arranged for example along the sidewalls, without covering the entire crown.

The crown 40 comprises a reinforcement consisting of at least one and preferably two primary reinforcement structures (crown plies), providing this tire zone with the required protection and rigidity. In the example illustrated in FIG. 1, an inner primary reinforcement structure 42 and an outer primary reinforcement structure 43 are disposed adjacent and substantially parallel to one another. The orientation of the primary reinforcement structure cords is preferably reversed and intersecting. A space filled with suitable rubber mix is provided between the two structures in order to prevent any contact between them. The primary reinforcement structures are each divided into two separate zones forming on the one hand median portions 45 of primary reinforcement structures and on the other hand lateral portions 47 of primary reinforcement structures, disposed axially each side of the median portions 45. The median portions 45 are disposed radially more to the inside than the lateral portions 47. Junction zones 50 ensure connection of the radially spaced zones. The junction zones 50 may be formed for example, starting at an edge of a median portion, by a first arched sector 51 allowing the primary reinforcement structure to develop from a substantially rectilinear profile into a profile extending radially and axially outwards, then by a substantially rectilinear sector 52, allowing radial ascent towards the outside, then by an arched sector 53 allowing realignment of the profile in a substantially axially outward direction. As illustrated in FIG. 1, such a junction zone 50 advantageously forms a substantially drawn-out S-shaped profile. According to one advantageous variant embodiment of the invention, the junction zone 50 is such that the radii defining the arched sectors 51 and 53 are substantially opposing, and as large as possible, so as to direct the length of the substantially rectilinear sector 52 towards zero.

The crown reinforcement also comprises a series of circumferential reinforcements 44 disposed substantially at zero degrees and substantially parallel to one another. The row formed by the reinforcements preferably covers at least the central portion of the crown. The reinforcements advantageously consist of substantially circumferential cords. The presence of such an arrangement may be desired in order to optimise the mechanical properties of the crown of the tire, in particular in terms of circumferential rigidity. The series of circumferential reinforcements may be subdivided into two portions: a median circumferential reinforcement portion 44 and a lateral circumferential reinforcement portion 46, as illustrated in FIG. 2.

In order to gain maximum benefit from the space freed up by the omission of the central (or crown) portion of the reinforcement structure 10, the preferred radial position of the circumferential reinforcements 44 is such that they are disposed substantially between the ends 14 of the lateral reinforcements 10.

Figure 2:
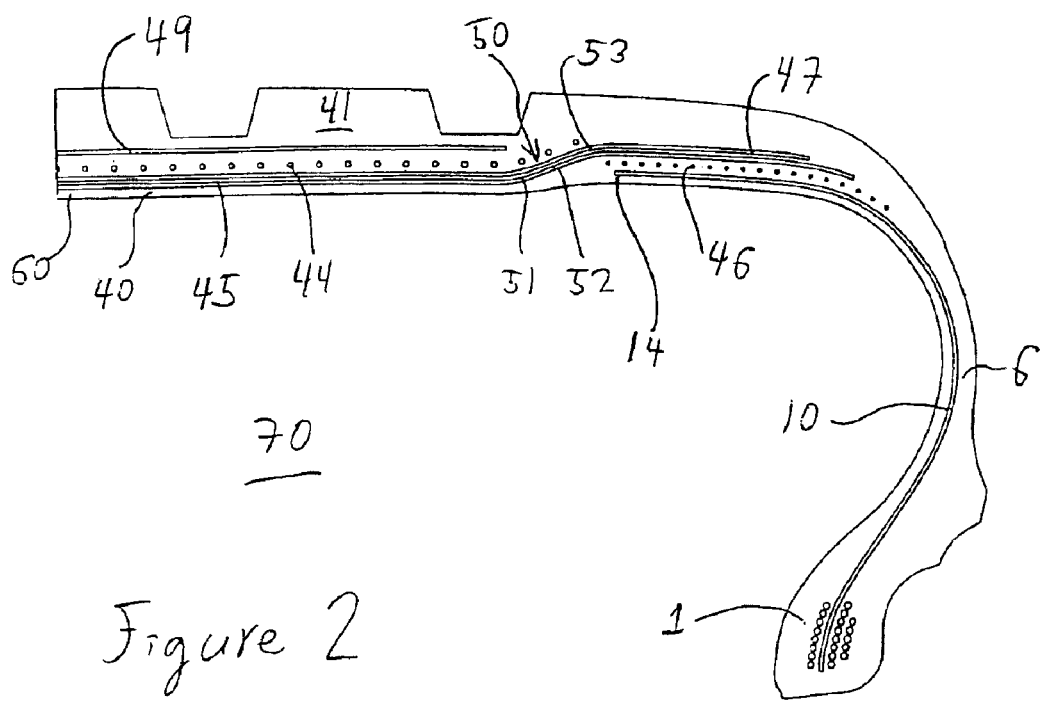
FIG. 2 is a radial section essentially showing a sidewall, a bead and a crown portion of a variant of the form of embodiment of FIG. 1.

The cords of the portion 46 are at the edge of the crown, advantageously disposed radially between on the one hand the reinforcement structures 10 and on the other hand the primary reinforcement structure lateral portions 47, as illustrated in FIG. 2. In this manner, the median circumferential reinforcement cords 44 and the lateral circumferential reinforcement cords 46 are advantageously substantially radially aligned. Other arrangements are also possible, for example with the lateral circumferential reinforcement portion cords 46 disposed radially outside the primary reinforcement structure lateral portions 47. The lateral circumferential reinforcement portion cords 46 are advantageously disposed axially substantially outside the median circumferential reinforcement cords 44. As illustrated in FIG. 2, the junction zone 50 then separates these two portions, A tread 41 is provided in the radially outer portion of the crown.

In the example illustrated in FIG. 1, a peripheral rubber mix zone 48 is disposed radially to the outside of the circumferential reinforcements 44. Widthwise, it may occupy a portion or indeed all of the space available between the primary reinforcement structure lateral portions. The specific arrangement of the primary reinforcement structures, axially towards the inside, substantially in the immediate vicinity of the inner cavity of the tire, allows a space to be formed in the radially outer zone of the crown, under the tread. Advantageously, only a thin layer of rubber mix 60 separates the inner primary reinforcement structure 42 from the inner cavity 70 of the tire.

The free zone of the crown is used in this embodiment to accommodate a special rubber mix whose characteristics are selected as a function of the type of tire. Some non-limiting examples follow of types of mixes:

a shock-absorbing mix: this mix is capable of having a positive effect on comfort, in particular on body noise and/or humming;

a mix with a high modulus of elasticity: such a mix is capable of having a favourable effect on slip behaviour;

a low hysteresis mix: such a mix is capable of reducing the hysteresis losses at the level of the crown with a favourable effect on the level of rolling resistance.

In the example illustrated in FIG. 2, a secondary reinforcement structure 49 is disposed radially to the outside of the primary reinforcement structure. Widthwise, it may occupy a portion or indeed all of the space available between the primary reinforcement structure lateral portions 47. The specific arrangement of the primary reinforcement structures, axially towards the inside, substantially in the immediate vicinity of the inner cavity of the tire, allows a space to be formed in the radially outer zone of the crown, under the tread. Advantageously, only a thin layer of rubber mix 60 separates the inner primary reinforcement structure 42 from the inner cavity 70 of the tire.

The free zone of the crown is used in this embodiment to accommodate a secondary reinforcement structure advantageously comprising special cord reinforcement elements whose characteristics are selected as a function of the type of tire, for example, reinforcement elements oriented substantially at 90° relative to the circumferential direction, in particular metal reinforcements with an elevated compression rigidity, in order to increase the rigidity of the crown zone.

Figure 3:
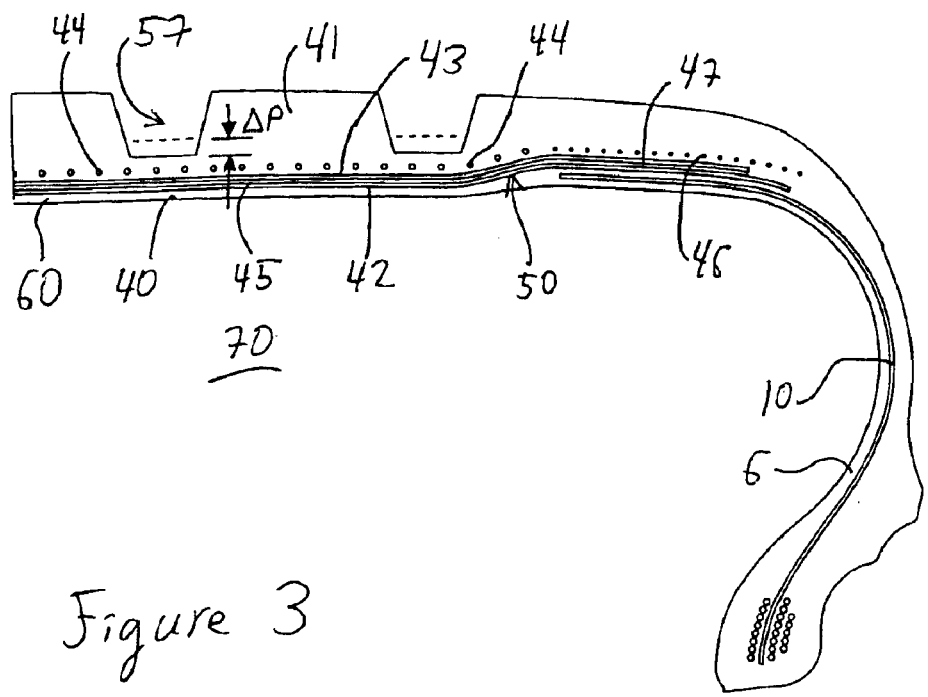
FIG. 3 is a radial section essentially showing a sidewall, a bead and a crown portion of another variant of the form of embodiment of FIG. 1.

In the example illustrated in FIG. 3, the free space in the outer zone of the crown is used for arranging tread pattern elements provided with hollows 57, such as for example grooves, the depth of which is advantageously greater than for a traditional tire, as illustrated in dotted lines for the purpose of comparison with the comparison depth ΔP. This greater depth provides flexibility of action, depending on requirements and the type of tire. For example, deeper grooves may serve to accommodate/evacuate a greater amount of water, contributing to optimisation of the hydrodynamic qualities of a tire. It is also possible to design a tire of elevated service life, due to the tread pattern elements which may suffer more pronounced wear.

Figure 4:
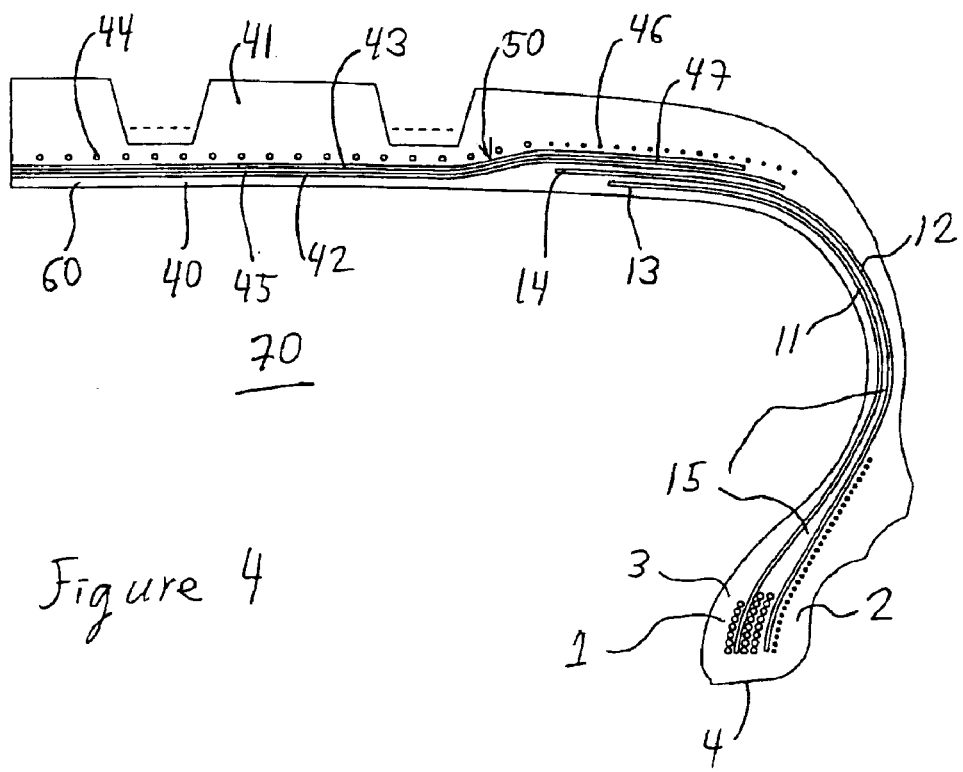
FIG. 4 is a radial section essentially showing a sidewall, a bead and a crown portion of another form of embodiment of a tire according to the invention.

According to an advantageous variant illustrated in FIG. 4, at least one of the two portions comprises a reinforcement structure provided with double reinforcements, namely an inner reinforcement 11 and an outer reinforcement 12, in accordance with their respective position at the level of the meridian profile of the tire. The reinforcements are arranged in adjacent manner and substantially parallel to one another and are spaced or separated from one another by a separating layer of rubber mix 15.

In the radially outer portion of the sidewall or in the region of the crown 40, the inner 11 and outer 12 reinforcements each comprise an end portion, respectively 13 and 14. These end portions are advantageously staggered. Thus, in the example illustrated, the axial positions of the end portion of the inner reinforcement 13 and the end portion of the outer reinforcement 14 are not the same: the end portion of the inner reinforcement 13 is axially further towards the outside than the end portion of the outer reinforcement 14.

Figure 5:
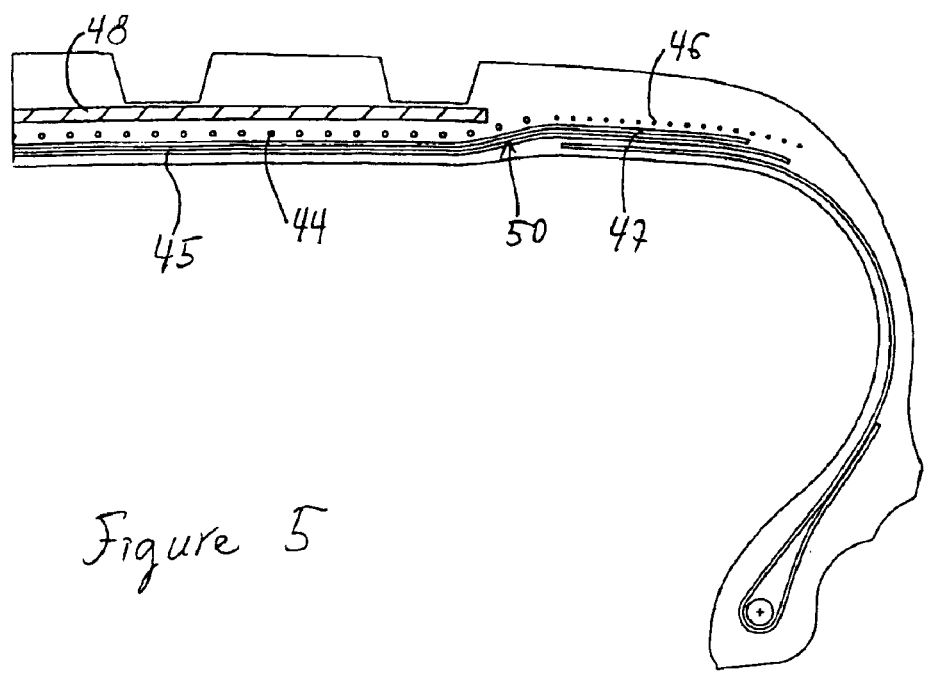
FIG. 5 is a radial section essentially showing a sidewall, a bead and a crown portion of another variant of the form of embodiment of FIG. 1.

FIG. 5 illustrates a variant comprising a traditional bottom zone with a turn-up about a bead wire. Such a bottom zone may also be used for one or other embodiment of the present invention.

Figure 6:
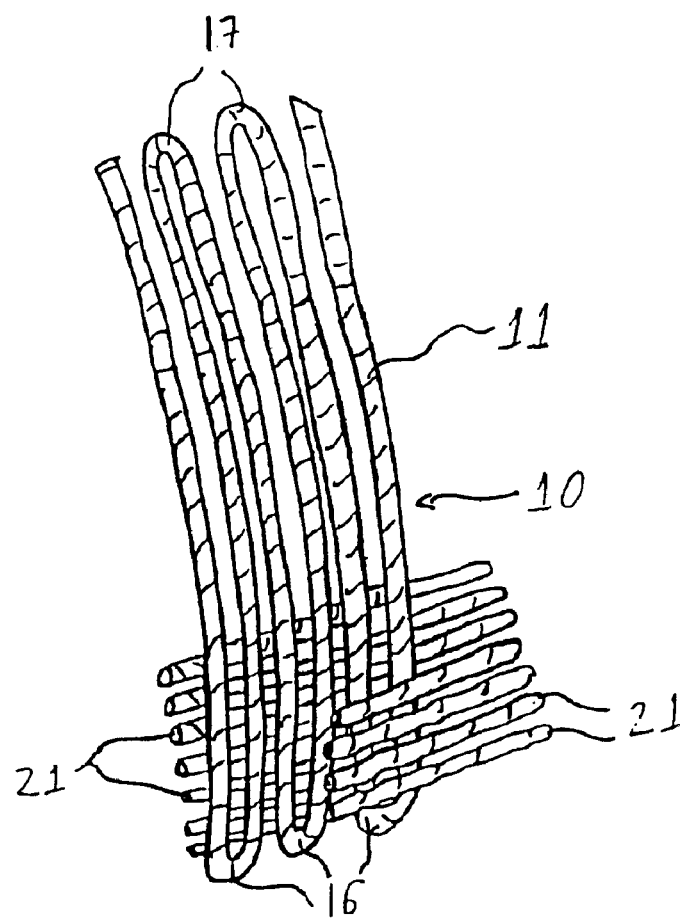
FIG. 6 illustrates the arrangement of some basic architectural elements of a tire according to the invention.

FIG. 6 illustrates more particularly an advantageous arrangement of the cords of the reinforcement structure 10. FIG. 6 illustrates a portion of the course of a structure comprising a single cord arranged in zigzag fashion to form a series of substantially parallel cord sections connected at the bottom and top by bottom loops 16 and top loops 17. The second structure 12 (not illustrated in this sectional view) is advantageously similarly configured. FIG. 6 additionally illustrates the bottom zone interface between the structure 10 and the cords 21.

In order to ensure perfect anchoring of the reinforcement structure, a composite, stratified bead is preferably produced. Inside the bead 1, circumferentially oriented cords are arranged between the cord rows of the reinforcement structure. These cords are disposed in a pile as in the Figures, or in several adjacent piles, or in bundles, or in any sensible arrangement, depending on the type of tire and/or the characteristics sought.

Circumferential cords 21, preferably arranged in the form of piles, form an arrangement of anchoring cords 20, provided in each of the beads. These cords are preferably of metal, and optionally brass coated. In each pile, the cords are advantageously substantially concentric and superposed.

The radially inner end portions of the reinforcement structure 10 cooperate with the beads. In this way, these portions are anchored in said beads in such a way as to ensure the integrity of the tire. To assist in this anchoring, the space between the circumferential cords and the reinforcement structure is occupied by a bonding rubber mix. It is also possible to use a plurality of mixes having different characteristics, delimiting a plurality of zones, the combinations of mixes and resultant arrangements being virtually unlimited.

The cord arrangements may be arranged and manufactured in various ways. For example, a pile may advantageously consist of a single cord wound (substantially at zero degrees) in a spiral of several turns, preferably from the smallest diameter to the largest diameter. A pile may also consist of a plurality of concentric cords positioned one inside the other, so as to superpose rings of progressively increasing diameter. It is not necessary to add a rubber mix to ensure impregnation of the reinforcement cord, or of the circumferential cord windings.

In order to position the reinforcement cords as precisely as possible, it is highly advantageous to build the tire on a rigid support, for example a rigid core determining the shape of the inner cavity thereof. All the constituents of the tire are applied to this core, in the order required by the final architecture, being arranged directly in their final location without the profile of the tire having to be turned over or folded during building. This building may use the devices described for example in EP 0 580 055, and French patent application 00/01394, for laying carcass reinforcement cords and in document EP 0 264 600 for laying the rubber products. The tire may be moulded and vulcanised as set forth in patent U.S. Pat. No. 4,895,692.

What is claimed is:

1. A tire comprising at least one reinforcement structure of carcass type anchored on each side of the tire in a bead whose base is designed to be mounted on a rim seat, a crown reinforcement, each bead being extended radially towards the outside by a sidewall, the sidewalls meeting up radially towards the outside with a tread, the reinforcement structure extending circumferentially from the bead towards said sidewall, said reinforcement structure being discontinuous over at least a portion of the crown of the tire, said crown reinforcement comprising on the one hand at least one primary reinforcement structure covering substantially the entire width of the crown, said primary reinforcement structures being each divided into two separate zones forming on the one hand median portions of primary reinforcement structures and on the other hand lateral portions of primary reinforcement structures, disposed axially each side of the median portions, said median portions being disposed radially more to the inside than the lateral portions and junction zones ensuring connection of the radially spaced zones, and at least one substantially axial row of median circumferential reinforcements disposed radially to the outside, substantially adjacent the median primary reinforcement structure portion.

2. The tire of claim 1, in which at least one substantially axial row of lateral circumferential reinforcements is disposed on each side of the tire.

3. The tire of claim 2, in which said row is disposed radially to the outside of the lateral primary reinforcement structure portion.

4. The tire of claim 2, in which said row is disposed radially to the inside of the lateral primary reinforcement structure portion.

5. The tire of claim 1, in which the row of median circumferential reinforcements extends over a width substantially identical to that of said median primary reinforcement structure portion.

6. The tire of claim 1, in which the radial position of said median circumferential reinforcements allows the latter to overlap between the ends of the carcass-type reinforcement structure.

7. The tire of claim 1, in which the crown comprises a zone provided with a radially inner excess thickness.

8. The tire of claim 7, in which the crown zone provided with an excess thickness is delimited axially by at least one transitional zone signalling the changeover of the internal wall of the tire towards a smaller radius while extending axially inwards.

9. The tire of claim 1, also comprising a secondary reinforcement structure disposed radially to the outside relative to the primary reinforcement structure.

10. The tire of claim 1, in which the primary and/or secondary reinforcement structure comprises cord elements generally arranged at an angle other than zero degrees relative to the circumferential direction.

11. The tire of claim 1, also comprising a peripheral rubber mix zone disposed radially to the outside relative to the primary reinforcement structure.

12. The tire of claim 1, also comprising at least one substantially median extra-deep hollow.

13. The tire of claim 1, in which the reinforcement structure of carcass type is double over at least one of the two sides of said tire.

* * * * *